United States Patent
Wedzikowski et al.

(10) Patent No.: US 11,926,504 B2
(45) Date of Patent: Mar. 12, 2024

(54) USING AND MODIFYING PRESET ELEVATOR CALLS

(71) Applicants: Lucien Wedzikowski, Paris (FR); Otis Elevator Company, Farmington, CT (US)

(72) Inventors: Lucien Wedzikowski, Paris (FR); Adam Kuenzi, Silverton, OR (US); Bradley Armand Scoville, Farmington, CT (US); Kelly Martin Dubois, Unionville, CT (US); Ashley Chapman, Plainville, CT (US); Paul A. Simcik, Southington, CT (US); Eric C. Peterson, East Longmeadow, MA (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 1556 days.

(21) Appl. No.: 16/091,582

(22) PCT Filed: Apr. 6, 2016

(86) PCT No.: PCT/IB2016/000603
§ 371 (c)(1),
(2) Date: Oct. 5, 2018

(87) PCT Pub. No.: WO2017/175021
PCT Pub. Date: Oct. 12, 2017

(65) Prior Publication Data
US 2019/0161318 A1 May 30, 2019

(51) Int. Cl.
*B66B 1/46* (2006.01)
*B66B 1/24* (2006.01)
(Continued)

(52) U.S. Cl.
CPC ............ *B66B 1/468* (2013.01); *B66B 1/2408* (2013.01); *B66B 1/3461* (2013.01); *H04W 4/021* (2013.01);
(Continued)

(58) Field of Classification Search
CPC .......... B66B 1/34; B66B 1/3446–3461; B66B 1/468; B66B 2201/10–104; B66B 2201/4607–4669
See application file for complete search history.

(56) References Cited

U.S. PATENT DOCUMENTS 5,952,626 A * 9/1999 Zaharia ................... B66B 1/468
187/395
6,202,799 B1 3/2001 Drop
(Continued)

FOREIGN PATENT DOCUMENTS

CN 1314301 A 9/2001
CN 2714509 Y 8/2005
(Continued)

OTHER PUBLICATIONS

Indian Office Action for Application No. 201817039253; dated Nov. 17, 2021; 6 Pages.
(Continued)

*Primary Examiner* — Christopher Uhlir
(74) *Attorney, Agent, or Firm* — CANTOR COLBURN LLP

(57) ABSTRACT

A system and a method of implementing and using a preset elevator call using an elevator system and a mobile device are provided. The method includes generating the preset elevator call that includes programmed conditions that include a destination floor, storing the preset elevator call in a user profile on the mobile device and at least one corresponding triggering condition, retrieving the preset elevator
(Continued)

call based on detecting the corresponding triggering condition, and executing the retrieved preset elevator call.

18 Claims, 8 Drawing Sheets

(51) Int. Cl.
*B66B 1/34* (2006.01)
*H04W 4/021* (2018.01)

(52) U.S. Cl.
CPC . *B66B 2201/103* (2013.01); *B66B 2201/4615* (2013.01); *B66B 2201/4653* (2013.01)

(56) References Cited

U.S. PATENT DOCUMENTS

| | | | |
|---|---|---|---|
| 6,382,363 | B1 | 5/2002 | Friedl |
| 6,397,976 | B1 | 6/2002 | Hale et al. |
| 6,425,460 | B2 | 7/2002 | Schuster |
| 6,615,175 | B1 | 9/2003 | Gazdzinski |
| 6,772,862 | B2 | 8/2004 | Friedli |
| 6,986,408 | B2 | 1/2006 | Takeuchi |
| 7,162,233 | B2 | 1/2007 | Chiba |
| 7,353,915 | B2 | 4/2008 | Zaharia |
| 7,377,364 | B2 | 5/2008 | Tyni et al. |
| 7,500,544 | B2 * | 3/2009 | Hakala .............. B66B 1/463 187/382 |
| 7,536,034 | B2 | 5/2009 | Rhoads et al. |
| 7,620,817 | B2 | 11/2009 | Friedli et al. |
| 7,664,464 | B2 | 2/2010 | Gerstenkorn |
| 8,140,403 | B2 | 3/2012 | Ramalingam et al. |
| 8,499,895 | B2 | 8/2013 | Zweig |
| 8,820,486 | B2 | 9/2014 | Gerstenkorn et al. |
| 8,880,200 | B2 | 11/2014 | Nowel |
| 9,238,568 | B2 | 1/2016 | Nonami |
| 9,284,158 | B2 | 3/2016 | Sarjanen |
| 10,934,132 | B2 * | 3/2021 | Troesch ................ B66B 1/468 |
| 2007/0026802 | A1 | 2/2007 | Gerstenkorn |
| 2012/0093985 | A1 | 4/2012 | Vasilescu |
| 2013/0048435 | A1 | 2/2013 | Finschi |
| 2013/0052946 | A1 | 2/2013 | Chatterjee et al. |
| 2014/0111415 | A1 | 4/2014 | Gargi et al. |
| 2014/0131142 | A1 | 5/2014 | Parkkinen et al. |
| 2015/0026648 | A1 | 1/2015 | Wu et al. |
| 2015/0158693 | A1 | 6/2015 | Talonen et al. |
| 2015/0251874 | A1 | 9/2015 | Salmikuukka |
| 2016/0009525 | A1 | 1/2016 | Depaola et al. |

FOREIGN PATENT DOCUMENTS

| | | |
|---|---|---|
| CN | 101670963 A | 3/2010 |
| CN | 103569812 A | 2/2014 |
| CN | 104495538 A | 4/2015 |
| EP | 0699617 A1 | 3/1996 |
| EP | 1140686 B1 | 11/2006 |
| FR | 2587319 A1 | 3/1987 |
| JP | H07307984 A | 11/1995 |
| JP | 2005280906 A | 10/2005 |
| JP | 2014156356 A | 8/2014 |
| KR | 20060103526 A | 10/2006 |
| WO | 2002066357 A1 | 8/2002 |
| WO | 2012093985 A1 | 7/2012 |
| WO | 2014116182 A1 | 7/2014 |
| WO | 2014178790 A1 | 11/2014 |
| WO | 2015075304 A1 | 5/2015 |
| WO | 2015084396 A1 | 6/2015 |
| WO | 2015094178 A1 | 6/2015 |

OTHER PUBLICATIONS

International Search Report and Written Opinion for application PCT/IB2016/000603, dated Dec. 19, 2016, 11 pages.
Shake to Call/Message FREE—Android Apps on Google Play; Internet; URL: https://play.google.com/store/apps/details?id=root.shaketocallmessage&hl=en; 3 pgs.
Turunen, et al.; "Mobile Interaction with Elevators—Improving People Flow in Complex Buildings"; 8 pgs.
Korean Office Action for Application No. 1020187032051; dated Oct. 26, 2022; 7 Pages.
Japan Office Action for application JP 2018-552768 , dated Mar. 10, 2020 , 8 pages.

* cited by examiner

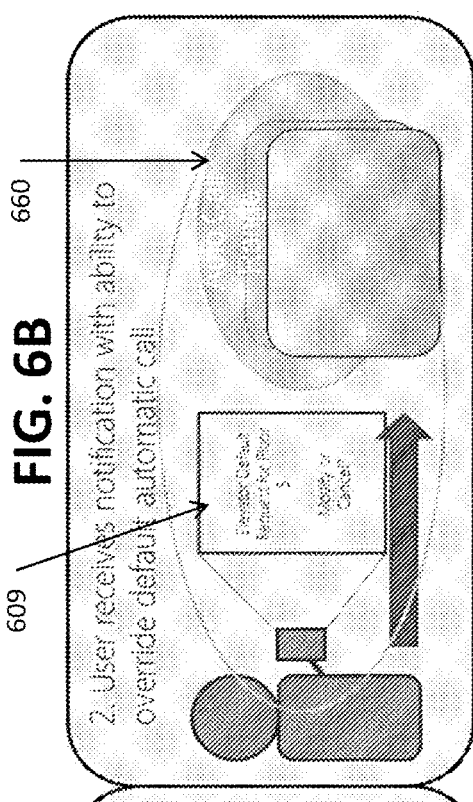
FIG. 6A — 1. Approach Reader, Mobile Connects
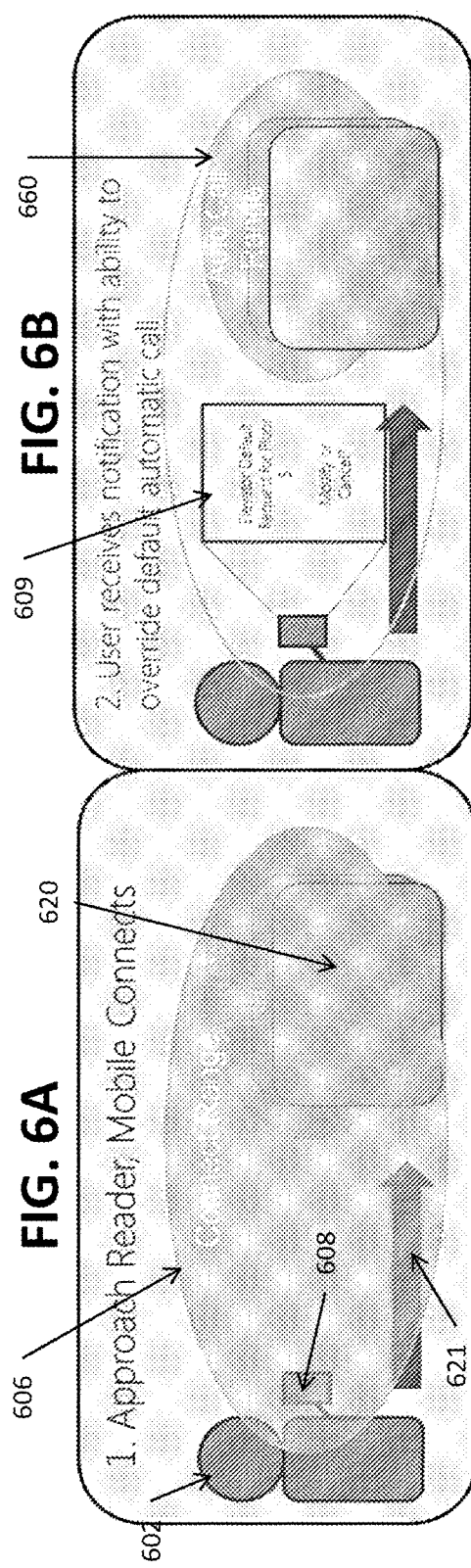
FIG. 6B — 2. User receives notification with ability to override default automatic call
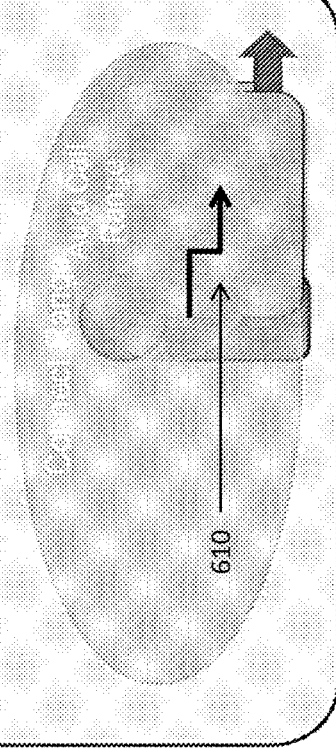
FIG. 6C — 3. Enter Auto Call Range, Request sent
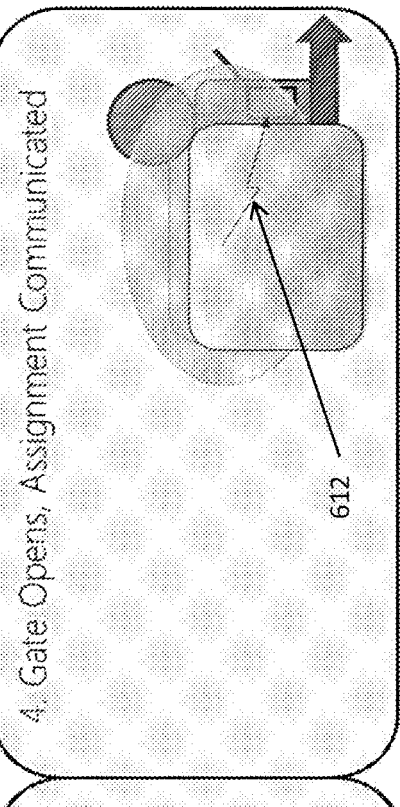
FIG. 6D — 4. Gate Opens, Assignment Communicated

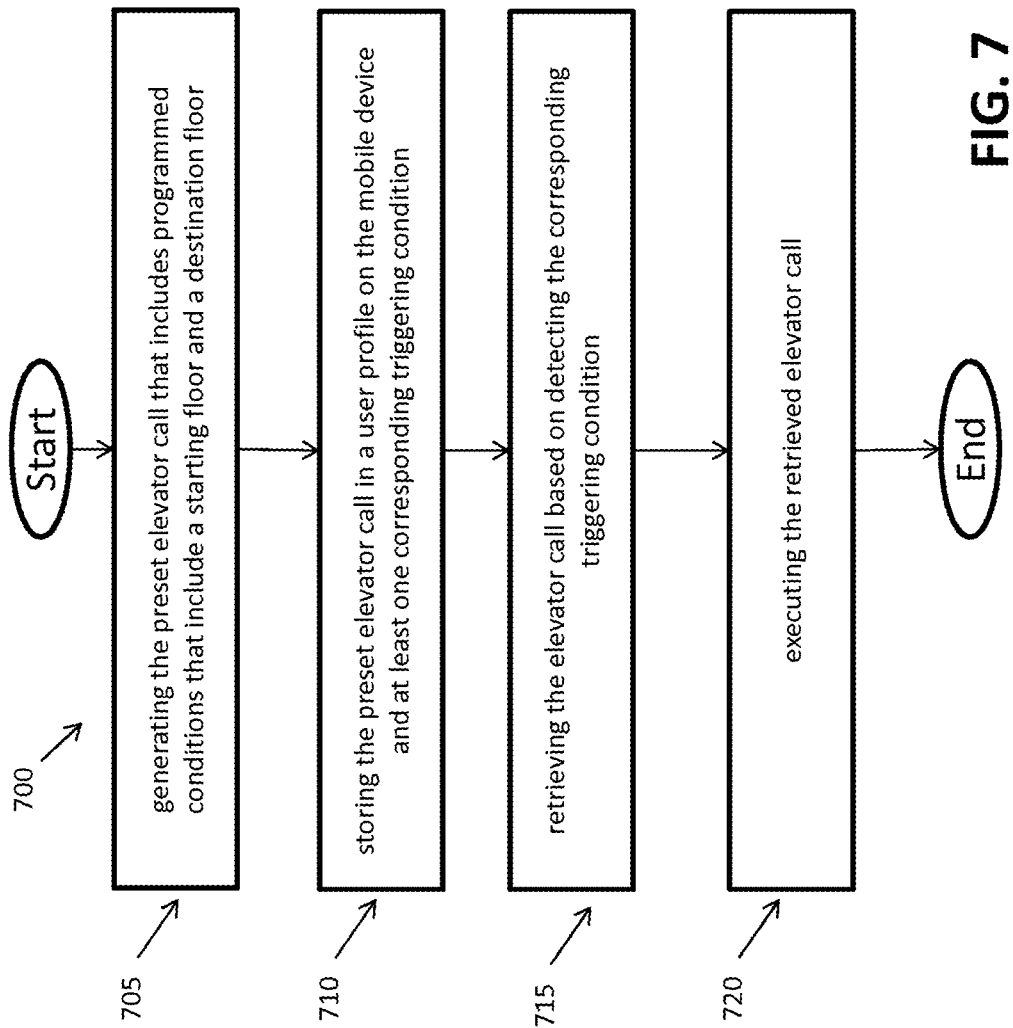

USING AND MODIFYING PRESET ELEVATOR CALLS

TECHNICAL FIELD

The subject matter disclosed herein generally relates to elevator service calls and, more particularly, to preset elevator service calls.

DESCRIPTION OF RELATED ART

An elevator user typically has limited options for how and when to call an elevator. Further, a user today must provide a specific input to make an elevator call. For example, an elevator user can register an elevator call by pressing a button built into a wall in the elevator lobby, touching a kiosk in or near the elevator lobby, or can make a direct elevator call using a mobile device. Some examples of a mobile device include an RFID card that is swiped at a sensor at or near the elevator lobby or a wireless electronic device that sends the elevator call when a user provides such an input. Particularly, smart phone applications are emerging that allow passengers to manually call an elevator by opening the app, selecting where they are and where they want to go. This explicit indication of origin location is required because the implicit location of a fixed call entry button (e.g. hall call) is not available to a portable device without secondary means (e.g. GPS location, altitude, etc.) for the device to provide location information automatically.

However, there is no current way to trigger a call automatically. Further, for example in the case of the RFID tags and button presses, there is no way to override the call if a passenger is headed to a different destination than the default floor. Thus, the default floor that is stored in the security database is called every time a user inputs the elevator call using the RFID tag, which may in fact be an erroneous destination. It is possible for the passenger to select their intended destination after the default destination was entered, but this result degraded dispatching performance due to an additional call.

Accordingly, one or more methods and systems that can provide adjustable automatic elevator calls are desired.

SUMMARY

According to one embodiment a method of implementing and using a preset elevator call using an elevator system and a mobile device is provided. The method includes generating the preset elevator call that includes programmed conditions that include a destination floor, storing the preset elevator call in a user profile on the mobile device and at least one corresponding triggering condition, retrieving the preset elevator call based on detecting the corresponding triggering condition, and executing the retrieved preset elevator call.

In addition to one or more of the features described above, or as an alternative, further embodiments may include prompting a user with a notification for changing the programmed conditions of the preset elevator call prior to executing the retrieved preset elevator call, wherein the notification includes an input interface for changing the programmed conditions of the preset elevator call.

In addition to one or more of the features described above, or as an alternative, further embodiments may include prompting a user with a notification for changing the programmed conditions of the preset elevator call after executing the retrieved preset elevator call, wherein the notification includes an input interface for changing the programmed conditions of the preset elevator call.

In addition to one or more of the features described above, or as an alternative, further embodiments may include prompting a user with a notification for changing the programmed conditions of the preset elevator call, wherein the notification is one selected from a group consisting of a graphical user interface (GUI) displayed on the mobile device, an interactive video displayed on the mobile device, an audio playback with audio listening input capability, and a vibration pattern output.

In addition to one or more of the features described above, or as an alternative, further embodiments may include prompting a user with a notification for changing the programmed conditions of the preset elevator call, wherein the notification includes an input interface for changing the programmed conditions of the preset elevator call, and wherein the input interface is one or more selected from a group consisting of a graphical user interface (GUI) displayed on the mobile device, an interactive video displayed on the mobile device, an audio playback with audio listening input capability, and a vibration pattern output.

In addition to one or more of the features described above, or as an alternative, further embodiments may include prompting a user with a notification for changing the programmed conditions of the preset elevator call, wherein prompting the user is triggered by moving the mobile device within range of a first wireless communication area, and wherein the notification expires and the elevator call is executed when the mobile device moves within range of a second wireless communication area within the first wireless communication area.

In addition to one or more of the features described above, or as an alternative, further embodiments may include wherein the corresponding triggering condition is a geofencing condition that includes detecting the mobile device resides within a defined area using global positioning system (GPS) or cellular towers.

In addition to one or more of the features described above, or as an alternative, further embodiments may include wherein the corresponding triggering condition is a geofencing condition that includes detecting the mobile device resides within a defined area, wherein the defined area is determined based on at least one of triangulating the mobile device, tracking the mobile device using at least one of a determining approximate position based on a connection to at least one of a Bluetooth device, near field communication, WiFi, and z-wave wireless communication device with a known position.

In addition to one or more of the features described above, or as an alternative, further embodiments may include wherein the corresponding triggering condition is a gesture, wherein the gesture is one or more of a shake of the mobile device, a tap on the mobile device, a mobile device camera detected movement, and a stationary camera detected movement, or a combination of gestures, wherein different gestures or combination of gestures correspond to different preset elevator calls.

In addition to one or more of the features described above, or as an alternative, further embodiments may include wherein the programmed conditions included in the elevator call further include one or more of a starting floor, a specific elevator car request, a pet indicator, an extra load time request, a large load indicator, and an ambient elevator car environment settings, wherein the elevator car environment settings includes lighting value and music selection.

In addition to one or more of the features described above, or as an alternative, further embodiments may include wherein the corresponding triggering condition is one or more of a mobile device location, a tap on the mobile device, a shake of the mobile device, a touch on a touchscreen of the mobile device, a voice command input through a microphone of the mobile device, an image input through an image sensor of the mobile device, a video input through the image sensor of the mobile device, and a physical button built into the surface of the mobile device.

In addition to one or more of the features described above, or as an alternative, further embodiments may include wherein the corresponding triggering condition is one or more of a date, a time, a location, a schedule, a linked calendar, an emergency, an elevator system sensor value, and a mobile device sensor value.

According to one embodiment a system for implementing and using a preset elevator call using an elevator system and a mobile device is provided. The system includes a mobile device including a processor configured to generate the preset elevator call that includes programmed conditions that include a destination floor, and a memory configured to store the preset elevator call in a user profile and store at least one corresponding triggering condition, and an elevator including an elevator controller that is configured to receive the preset elevator call and call one or more elevator cars, and the one or more elevator cars that are configured to travel between floors of a building based on the preset elevator call received from the elevator controller.

In addition to one or more of the features described above, or as an alternative, further embodiments may include a touchscreen display on the mobile device configured to display a notification for changing the programmed conditions of the preset elevator call prior to executing the retrieved preset elevator call, wherein the notification includes an input interface for changing the programmed conditions of the preset elevator call, wherein the notification is one selected from a group consisting of a graphical user interface (GUI) displayed on the mobile device, an interactive video displayed on the mobile device, an audio playback with audio listening input capability, and a vibration pattern output, and wherein the input interface is one or more selected from a group consisting of a touch screen, a kiosk, a security station, a beacon, a hall call fixture, a lantern, a bridge, a router, a network node, and a mobile device.

In addition to one or more of the features described above, or as an alternative, further embodiments may include wherein displaying the notification to the user is triggered by moving the mobile device within range of a first wireless communication area, and wherein the notification expires and the elevator call is executed when the mobile device moves within range of a second wireless communication area within the first wireless communication area.

In addition to one or more of the features described above, or as an alternative, further embodiments may include wherein the corresponding triggering condition is a geofencing condition that includes detecting the mobile device resides within a defined area, wherein the defined area is determined based on at least one of triangulating the mobile device, tracking the mobile device using at least one of a global positioning system (GPS), cellular towers, and determining approximate position based on a connection to at least one of a Bluetooth device, near field communication, WiFi, and z-wave wireless communication device with a known position.

In addition to one or more of the features described above, or as an alternative, further embodiments may include wherein the corresponding triggering condition is a gesture, wherein the gesture is at least one or more of a shake of the mobile device, a tap on the mobile device, a mobile device camera detected movement, and a stationary camera detected movement, a combination of gestures, wherein different gestures correspond to different preset elevator calls, and wherein different combination of gestures correspond to different preset elevator calls.

In addition to one or more of the features described above, or as an alternative, further embodiments may include wherein the programmed conditions included in the elevator call further include one or more of a specific elevator car request, a person to call ratio for a group call, a pet indicator, an extra load time request, a large load indicator, and an ambient elevator car environment settings, wherein the elevator car environment settings includes lighting value and music selection, and wherein the corresponding triggering condition is one or more of a mobile device location, a tap on the mobile device, a shake of the mobile device, a touch on a touchscreen of the mobile device, a voice command input through a microphone of the mobile device, an image input through an image sensor of the mobile device, a video input through the image sensor of the mobile device, a physical button built into the surface of the mobile device, a date, a time, a location, a schedule, a linked calendar, an emergency, an elevator system sensor value, and a mobile device sensor value.

According to one embodiment a computer program product for implementing and using a preset elevator call using an elevator system and a mobile device is provided. The computer program product including a computer readable storage medium having program instructions embodied therewith, the program instructions executable by a processor to cause the processor to generate the preset elevator call that includes programmed conditions that include a destination floor, store the preset elevator call in a user profile on the mobile device and at least one corresponding triggering condition, retrieve the preset elevator call based on detecting the corresponding triggering condition, and execute the retrieved preset elevator call.

In addition to one or more of the features described above, or as an alternative, further embodiments may include additional program instructions executable by the processor to cause the processor to prompt a user with a notification for changing the programmed conditions of the preset elevator call, wherein the notification includes an input interface for changing the programmed conditions of the preset elevator call.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The foregoing and other features, and advantages of the present disclosure are apparent from the following detailed description taken in conjunction with the accompanying drawings in which:

FIGS. 6A through 6D depict operations being executed using a method and system for implementing and using a preset elevator call using an elevator system and a mobile device in accordance with one or more embodiments of the present disclosure;

FIG. 7 depicts a flow diagram of a method of implementing and using a preset elevator call using an elevator system and a mobile device in accordance with one or more embodiments of the present disclosure.

DETAILED DESCRIPTION

Figure 1:
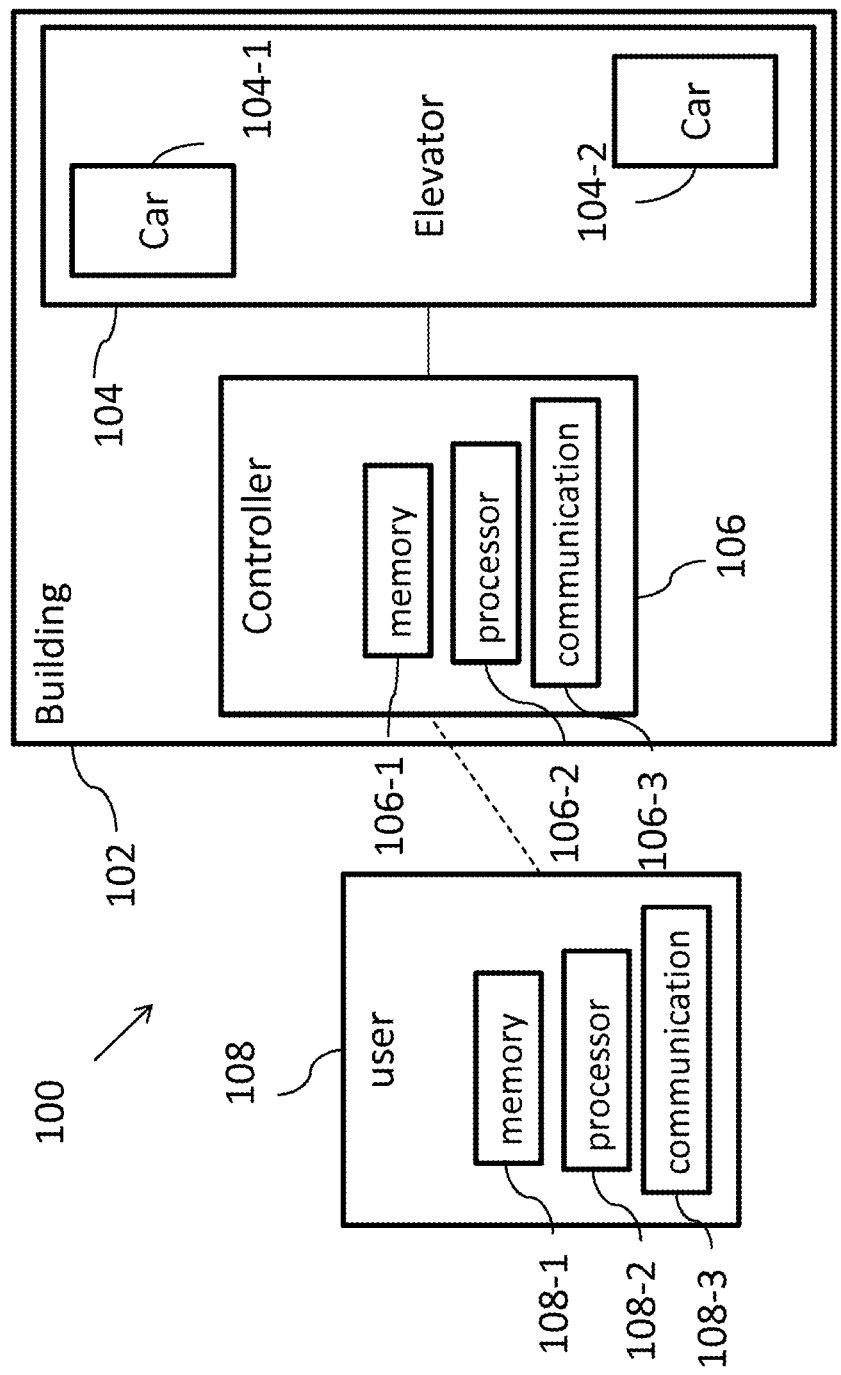
FIG. 1 depicts an elevator system in accordance with one or more embodiments of the present disclosure.

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

Embodiments described herein are directed to a method and system for implementing and using a preset elevator call using an elevator system and a mobile device. For example, according to one or more embodiments, a system is provided that can store preset elevator calls in a user profile on a mobile device as well as the conditions under which preset elevator calls are retrieved and sent to the elevator. Alternatively user-specific preset call profiles may be stored in an elevator controller, or an ancillary system, e.g. premises access system, which communicates with an elevator controller. According to one embodiment, preset elevator calls are set by the user for each building. According to another embodiment, the user can program preset calls based on time and day of the week. Further, according to another embodiment, each preset call includes a starting floor and the desired destination floor. The user can also program their preferences for those preset calls in accordance with another embodiment. For example, a user leaving their apartment may need special elevator service because they are traveling with their pet. Another example includes a scenario where after lunch a user might travel with a number of other coworkers back to the office floor. For either of these examples, the user can set up a preset elevator call that defines how they would like to get to the elevator and how they would like to receive a notification of an elevator assignment, for example a vibration, sound, image, email, or text message. One or more such embodiments may provide a convenient method of call entry for users with their hands full. Further, being able to program the preset calls such that they can be dynamically tailored to the individual user provides efficient and automatic elevator calls through the use of such a method for dynamic default calls instead of entering spurious calls when the RFID default floor is wrong.

Turning now to the figures, FIG. 1 depicts an elevator system 100 in accordance with one or more embodiments. The elevator system 100 is shown installed at a building 102. In some embodiments, the building 102 may be an office building or a collection of office buildings that may or may not be physically located near each other. The building 102 may include a number of floors. Persons entering the building 102 may enter at a lobby floor, or any other floor, and may go to a destination floor via one or more conveyance devices, such as a specific elevator car, e.g. 102-1 in elevator 104. Note that in some embodiments, the floor location may be specific to one, another, or both doors in a multi-door elevator car.

The elevator 104 may be coupled to one or more computing devices, such as a controller 106. The controller 106 may be configured to control dispatching operations for one or more elevator cars (e.g., cars 104-1, 104-2) associated with the elevator 104. The elevator cars 104-1 and 104-2 may be located in the same hoist way or in different hoist ways so as to allow coordination amongst elevator cars in different elevator banks serving different floors. It is understood that other components of the elevator system 100 (e.g., drive, counterweight, safeties, etc.) are not depicted for ease of illustration.

Also shown in FIG. 1 is a mobile device 108. The mobile device 108 may include a device that is typically carried by a person, such as a phone, PDA, electronic wearable, RFID tag, laptop, tablet, watch, or any other known portable mobile device. The mobile device 108 may include a processor 108-2, a memory 108-1, and a communication module 108-3 as shown in FIG. 1. The processor 108-2 can be any type or combination of computer processors, such as a microprocessor, microcontroller, digital signal processor, application specific integrated circuit, programmable logic device, and/or field programmable gate array. The memory 108-1 is an example of a non-transitory computer readable storage medium tangibly embodied in the mobile device 108 including executable instructions stored therein, for instance, as firmware. The communication module 108-3 may implement one or more communication protocols as described in further detail herein.

The controller 106 may include a processor 106-2, a memory 106-1, and communication module 106-3 as shown in FIG. 1. The processor 106-2 can be any type or combination of computer processors, such as a microprocessor, microcontroller, digital signal processor, application specific integrated circuit, programmable logic device, and/or field programmable gate array. The memory 106-1 is an example of a non-transitory computer readable storage medium tangibly embodied in the controller 106 including executable instructions stored therein, for instance, as firmware. The communication module 106-3 may implement one or more communication protocols as described in further detail herein.

The mobile device 108 and the controller 106 communicate with one another. According to one or more embodiments, the communication between the mobile device 108 and the controller 106 is done through other systems such as transmitters, converters, receivers, and other transmitting and processing elements depending on the communication type selected. For example, the mobile device 108 and the controller 106 may communicate with one another when proximate to one another (e.g., within a threshold distance). The mobile device 108 and the controller 106 may communicate over a wireless network, such as 802.11x (WiFi), short-range radio (Bluetooth), or any other known type of wireless communication. In some embodiments, the controller 106 may include, or be associated with (e.g., communicatively coupled to) a networked element, such as kiosk, beacon, hall call fixture, lantern, bridge, router, network node, etc. The networked element may communicate with the mobile device 108 using one or more communication protocols or standards. For example, the networked element may communicate with the mobile device 108 using near field communications (NFC), or any type of known wired or wireless communication means. According to one or more other embodiments, the networked element may communicate with the mobile device 108 through a cellular network or over the internet through a number of other devices outside the building.

In other embodiments, the controller 106 may establish communication with a mobile device 108 that is outside of the building 102. This connection may be established with various technologies including GPS, triangulation, or signal strength detection, by way of non-limiting example. The communication connection that can be established includes, but is not limited to, a cellular connection, a WiFi connection, a Bluetooth connection, a peer-to-peer connection, a satellite connection, a NFC connection, some other wireless connection, and even a wired connection using an Ethernet cable, coaxial cable, or other data cable. These communication connections may transport data between the mobile device 108 using a number of different networks ranging from a private secure direct communication link to transporting the data over the internet through multiple different servers, switches, etc. Such technologies that allow early communication will provide users and the systems more time to establish the most efficient passenger flow, and may eliminate the need for a user to stop moving to interact with the system.

Implementation of a method and system of implementing and using a preset elevator call using an elevator system and a mobile device using the mobile device, controller, and elevator is described with reference to FIGS. 2-8.

Figure 2:
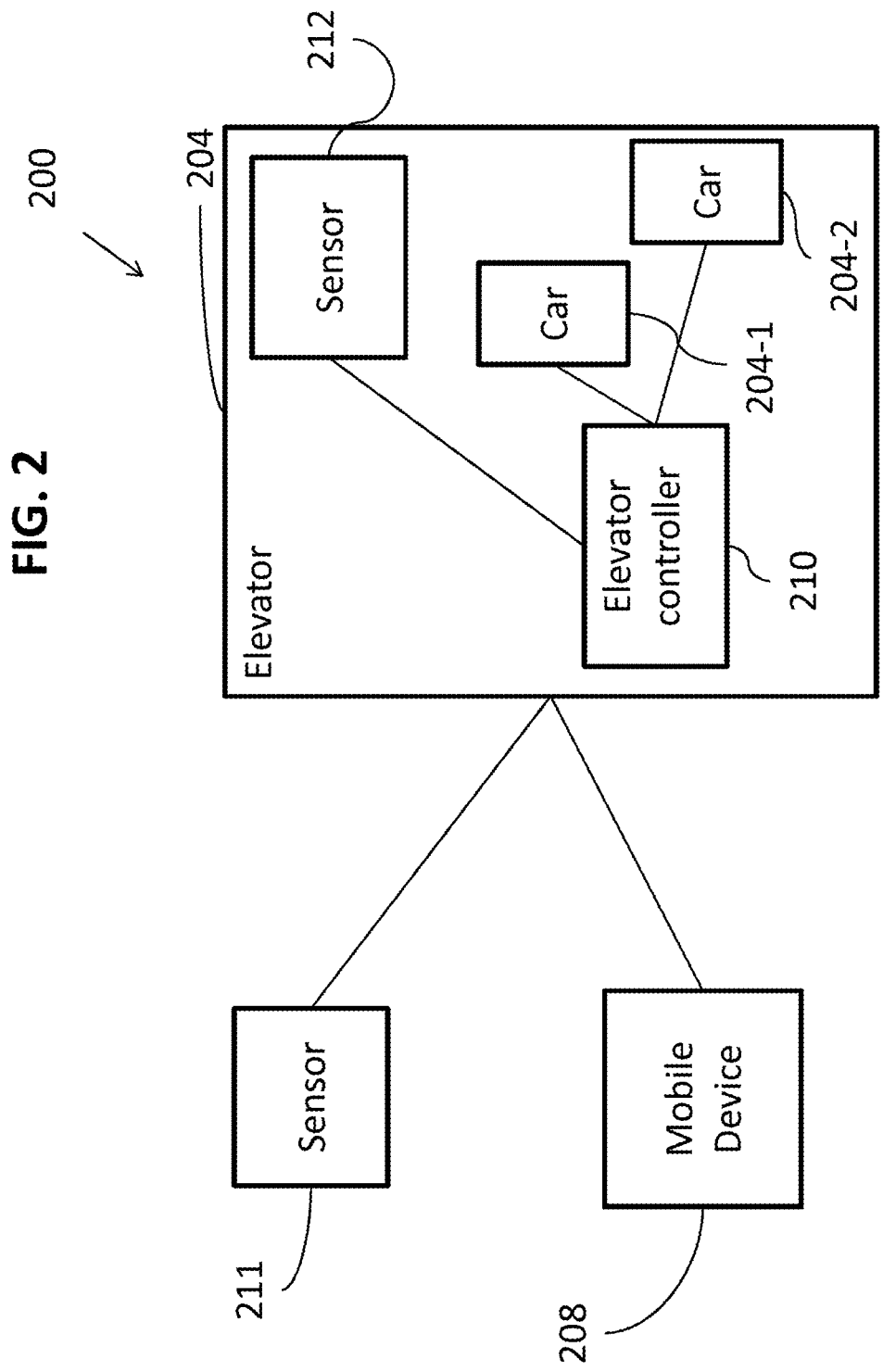
FIG. 2 depicts a system for implementing and using a preset elevator call using an elevator system and a mobile device in accordance with one or more embodiments of the present disclosure.

Referring to FIG. 2, a system 200 for implementing and using a preset elevator call using an elevator system 204 and a mobile device 208 is shown in accordance with one or more embodiments of the present disclosure.

The system 200 includes at least one elevator 204, a mobile device 208, a lobby sensor 211, and an elevator sensor 212. According to one or more embodiments, the system 200 may also include a plurality of mobile devices, touch screens, fixed displays, and/or sensors. The elevator 204 includes one or more cars 204-1, 204-2 as well as a controller 210. The elevator controller 210 is shown within the elevator system 100, but may be located elsewhere as shown in FIG. 1.

According to one embodiment, the method of implementing and using a preset elevator call includes generating the preset elevator call that has programmed conditions that include a starting floor and a destination floor. According to one embodiment the preset elevator call can be generated in the mobile device 208. Alternatively, according to another embodiment, the preset elevator call can be generated by the elevator controller 210. Further, according to another embodiment, the preset elevator call may be generated elsewhere in a cloud type computing environment by an off site server or distributed processing system.

The preset elevator call is stored in a user profile on the mobile device 208 with at least one corresponding triggering condition. According to another embodiment, the user profile is stored elsewhere such as on the controller or in a cloud computing resource. Further, the preset elevator call is retrieved and then executed based on detecting the corresponding triggering condition. The triggering condition may be a condition that is detectable by a sensor 211, 212. According to one or more embodiments, a number of different preset calls are provided. For example, a preset call that is time specific can be provide. In another embodiment, the preset call is location specific. Further, the present call can be day specific. Further, preset calls can include a number of different values and instructions. For example, a preset call can include departure and destination floors, number of people, special needs (pets, cart, bike, etc.).

According to another embodiment the triggering condition may be a data condition that is met when certain information is received. According to yet another embodiment, the triggering condition may be when a particular time, place, and/or particular device is reached, located, and/or detected. For example, geofencing can be used as a trigger. The geofencing can be GPS-based, Bluetooth proximity based, or any and all other methods for sensing position. Particularly, a geofencing trigger is used when a preset call is desired that is tied to a particular place in space. Accordingly a user can program entry into that space as a triggering event to launch a command. Accordingly, detecting when the space is entered or left serves as the triggering information. The geofencing can be implemented using a number of different local wireless signal transmitting devices and receivers or can use large wireless networks such as cellular networks, satellite networks, and distributed WiFi networks. For example, a geofence may be used, with a persistent wireless connection (e.g. cellular network) so that the "trigger" is computed by location, not by proximity sufficient to provide signaling.

Figure 3:
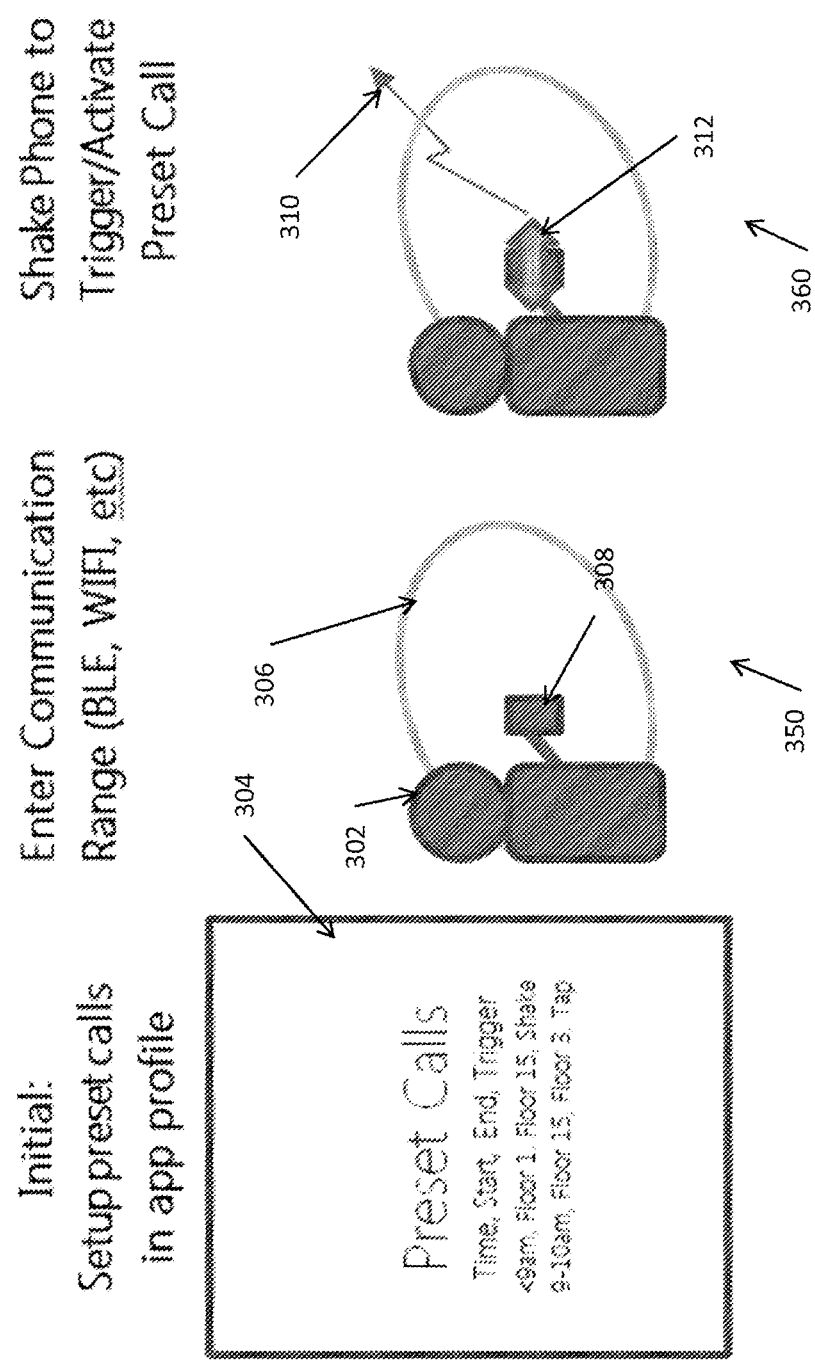
FIG. 3 depicts a use diagram showing operations being executed using a method and system for implementing and using a preset elevator call using an elevator system and a mobile device in accordance with one or more embodiments of the present disclosure.

For example, FIG. 3 depicts a use diagram showing operations being executed using a method and system for implementing and using a preset elevator call using an elevator system and a mobile device in accordance with one or more embodiments of the present disclosure. As shown, initially one or more preset calls are set up in an application profile of a user. The preset call may be displayed, as shown, in a GUI 304 that provides all the information in simple text. For example, in FIG. 3, the GUI 304 shows a list of preset calls and their conditions. For example, a first call is shown that is set for 9:00 am starting from the first floor and going to the $15^{th}$ floor and the triggering event that will initiate the call is a shake of the mobile device 308. A second call is also shown that is set for between 9:00 am and 10:00 am starting from the $15^{th}$ floor and going to the third floor and the triggering event that will initiate the call is a tap on the mobile device 308. Note that shaking and tapping are used as non-limiting examples of user-initiated activation.

Next, a user will enter within range of the wireless communication network of the building 306 (operation 350). The wireless network 306 may be a WiFi network, a Bluetooth network, or some other proximity-based network type such as GPS. As shown, the user 302 has entered the wireless communication network 306 as has the mobile device 308. Once the mobile device 308 in within range of the wireless network 306, the user 302 need only provide any of the triggers that are associated with a preset call to call an elevator in accordance with the parameters defined in that preset call that was triggered. For example, as shown a user 302 may shake 312 the user device 308 while within range, which will trigger the activation and transmittance 310 of the preset call (operation 360). According to another embodiment, proximity is not required as a geofencing implementation can be provided for the gesture based system as well.

According to another embodiment, any other known gesture could be used as a trigger for initiating the preset call. For example, the device may be flicked, swung, spun, or may undergo a combination of different movements. Any one or combination of gestures can each be associated with a different preset elevator call.

According to another embodiment, the user 302 may make a gesture with their hand, face, or body movement that is detected by a camera in the mobile device 308 or a video sensor located elsewhere as shown, for example, in FIG. 2. According to another embodiment the user 302 may make an utterance or vocalization, including spoken words, that are detected by a microphone located in the mobile device 308 or an audio sensor located elsewhere.

Figure 4:
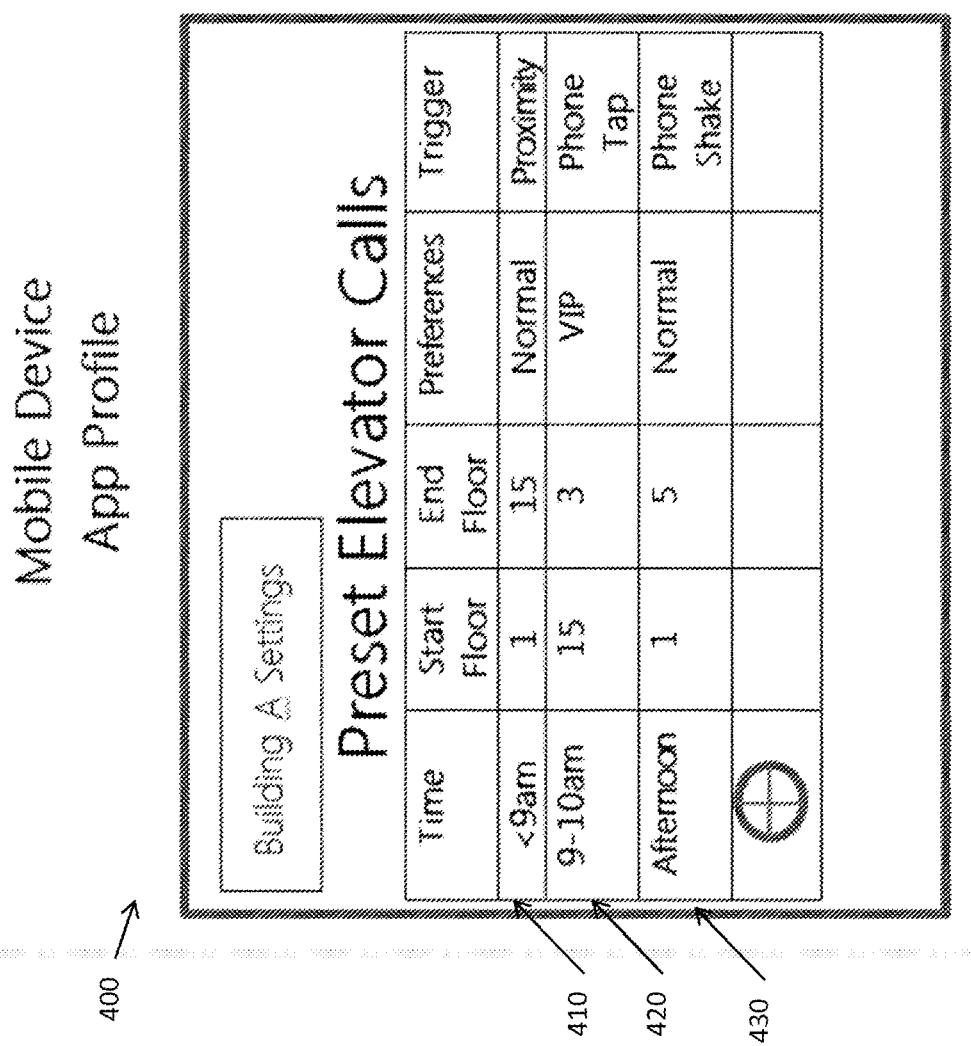
FIG. 4 depicts a table that contains a plurality of programmed and stored preset elevator calls in accordance with one or more embodiments of the present disclosure.

FIG. 4 depicts a table 400 that contains a plurality of programmed and stored preset elevator calls 410, 420, and 430 in accordance with one or more embodiments of the present disclosure. The table 400 may or may not be displayed on a display screen of a mobile device. The table 400 could also be viewed on other devices that provide the user access to their preset elevator call application. As shown, a preset elevator call may each include a number of programmed conditions. For example the preset elevator call 410 has the programmed conditions that include a starting floor, 1, and an ending floor, 15. The preset elevator call 410 also has the programmed condition of a time during which the preset elevator call is active. As shown, the preset elevator call 410 is active before 9:00 am, since this call may be intended to cover the scenario when the passenger enters the building for the first time on a given day. Other programmed conditions include preferences and what the specific trigger is for the preset elevator call. For example as shown, the preset elevator call 410 includes normal preferences and is triggered by a proximity value between the wireless device and the elevator. Another example of a preset elevator call 420 includes a time range between 9:00 am and 10:00 am, starting from floor 15, ending on floor 3, with VIP travel preferences set, and a trigger of a phone tap. For example, if a board meeting for a corporation is scheduled on floor 3 and the CEO of the company is located on floor 15, the CEO may be granted special VIP status to make sure he get a prioritized elevator call to attend the meeting on time. According to another embodiment, in a hospital setting if a doctor needs to respond to a patient on the third floor immediately, the doctor may be granted with the ability to request a VIP elevator call that send the nearest elevator immediately and sets the destination to the desired floor without any stops there between. Anything that elevator was already programmed to do can be shifted to another elevator or delayed in the queue of that elevator. Another example of a preset elevator call 430 may have the programmed conditions set for an afternoon time range, starting on the first floor, going to the fifth floor, with normal travel preferences, and set to be triggered by a phone shake. According to one or more embodiments, VIP travel preferences can provide prioritized elevator calling as well as requesting to travel alone amount other special accommodation requests that are normally not provided to a general user. This preference control may be granted by the building management. Further, as shown a "+" button can be included in the GUI 400 to allow a user to program additional preset elevator calls. According to one or more other embodiments, other programmed conditions may be included or removed. Some examples of other programmed conditions include a number of companion passengers, an additional gesture to set the call, a specific door wait time for a loading scenario, and a number of different triggers or combinational triggers. For example requiring both a phone shake and a verbal command, or a face pose and a particular location.

Other triggers may be sequential, e.g. regardless of what time a user enters a building, his "first" journey of the day, beginning in the lobby, is to his accustomed office floor; his next journey is to a cafeteria floor or other floor which is prioritized according to sequence of activity, not time of day.

Figure 5:
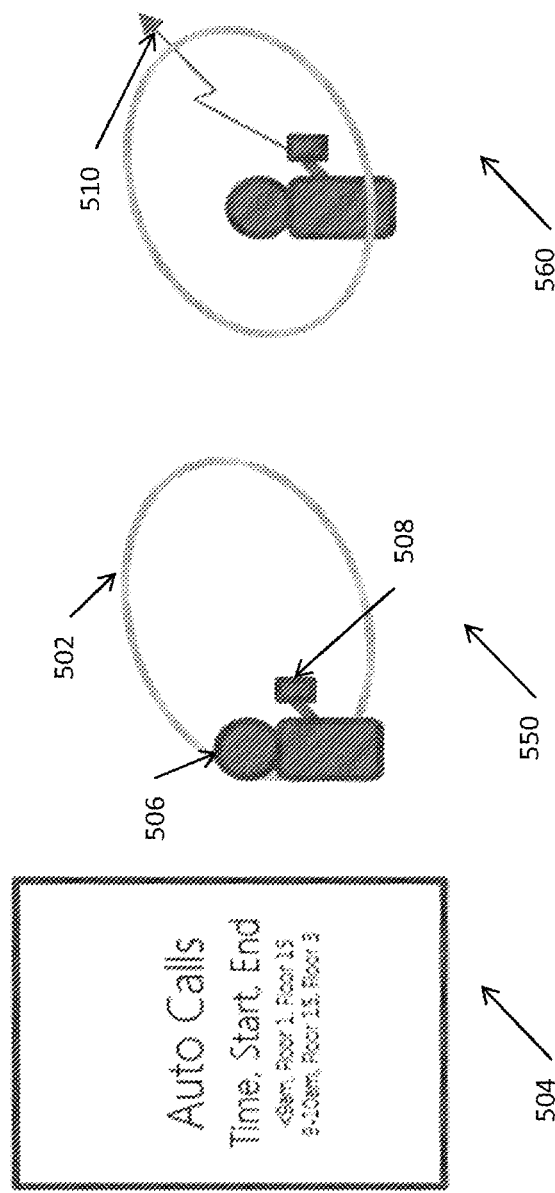
FIG. 5 depicts a use diagram showing operations being executed using a method and system for implementing and using a preset elevator call using an elevator system and a mobile device in accordance with one or more embodiments of the present disclosure.

FIG. 5 depicts a use diagram showing operations being executed using a method and system for implementing and using a preset elevator call using an elevator system and a mobile device in accordance with one or more embodiments of the present disclosure.

As shown, initially one or more preset calls are set up in an application profile of a user. The preset call may be displayed, as shown, in a GUI 504 that provides all the information in simple text. For example, in FIG. 5, the GUI 504 shows a list of preset calls and the conditions. For example, a first call is shown that is set for 9:00 am starting from the first floor and going to the $15^{th}$ floor and the triggering event that will initiate the call is a shake of the mobile device 508. A second call is also shown that is set for between 9:00 am and 10:00 am starting from the $15^{th}$ floor and going to the third floor and the triggering event that will initiate the call is a tap on the mobile device 508.

Next, a user will enter within range of the wireless communication network of the building 502 (operation 550). According to another embodiment, a geofencing area may be defined and detected using a number of large scale wireless networks such as a cellular or satellite network. The wireless network 502 may be a WiFi network, a Bluetooth network, or some other wireless network type. As shown, the user 506 has entered the wireless communication network 502 as well as has the mobile device 508. Once the mobile device 508 in within range of the wireless network 502 (which can also be determined using GPS or cellular triangulation), the user 506 may not need to provide any other triggers because geofencing can be used as the trigger to call an elevator in accordance with the parameters defined in that preset call that was triggered. For example, as shown a user 506 may enter the wireless communication area 502 with the user device 508, which will trigger the activation and transmittance 510 of the preset call (operation 560).

According to another embodiment, a number of geofencing zones could be carefully placed in close proximity or with purposefully overlapping transmittance areas any of which could be used as a trigger for initiating the preset elevator call. For example, a user device 508 could be detected leaving a zone which could trigger a call, or could be detected within two or more zones which could trigger another present call. Thus, any one or combination of geofencing zones can each be associated with a different preset elevator call.

FIGS. 6A through 6D depict operations being executed using a method and system for implementing and using a preset elevator call using an elevator system and a mobile device in accordance with one or more embodiments of the present disclosure. Specifically, the method includes an option to modify a preset elevator call for a time between entering a first area 606 and before entering a second area 660.

Specifically, as shown, in FIG. 6A, a user 602 has a user device 608 that can communicate with other devices and system through wireless communication. As shown the user 602, along with the mobile device 608, are moving along a vector path 621 toward an elevator gate 620. As the user 602 and mobile device 608 move toward the elevator, the user 602 and mobile device 608 enter a first wireless communication area 606, or is determined to be in a defined location detected using GPS or cellular triangulation. As shown the area is defined by the broad area within which a device in the area can communicate on that network. Thus as shown in the FIG. 6A, the communication area 60 is broad and the user 602 and mobile device 608 can be within that area 606 while still being a distance away from both the elevator and the gate 620 that leads to the elevator bank and the second wireless communication area 660 which covers a smaller area within which one can communicate wirelessly.

Moving on to FIG. 6B, when the user 602 enters the first wireless communication area 606, the user receives a notification 609 on the mobile device 608. The notification 609 informs the used that they have the option to modify, override, or cancel an automatic present elevator call that was requested by the mobile device 608 that was triggered in a manner as discussed above. For example, according to another embodiment, the same entering of the area 606 can serve as the preset elevator call trigger. The modification notification 609 may inform the user of the specific preset elevator call that has already been transmitted, and what modification options the user 602 has available. For example, the user may be able to modify the elevator call by cancelling, adjusting the specific elevator, adjusting the number of passengers, adjusting the time the elevator will arrive, and adjusting the destination floor, among other things. For example as shown, the user 602 is shown that a preset elevator call was made titled, "elevator default request for floor 5" and is further prompted with "modify or cancel?" The user 602 is provided the option to modify the preset elevator call for a limited duration of time based upon a second trigger. This limited duration of time can vary greatly from a few second, to a few minutes, to a few hours or even days.

Turning now to FIG. 6C, the user 602 is shown moving into the second wireless communication area 660 such that the mobile device 608 can communicate with this wireless network 660. Alternatively, the entry into the space can be determined using GPS or cellular resources. As shown, the second wireless communication area 660 is called a wireless range 660 because upon entering this area the mobile device 608 will transmit 610 the preset elevator call to the elevator with or without modification provided by the user during the modification timeframe. In one embodiment, the user 602 may be able to modify the call while they are located within the wireless communication area 660. In one embodiment, the user 602 may be able to modify the call while they are located within the wireless communication area 660 up until the time the called elevator arrives. In one embodiment, the user 602 may be prohibited from modifying the call while they are located within the wireless communication area 660. The elevator uses the preset elevator call to call an elevator car based on the programmed conditions provided in the preset elevator call.

Further, turning now to FIG. 6D once called, the elevator system will transmit the assignment 612 to the user and will open the gates 620 providing the user 602 access to the elevator bank.

FIG. 7 depicts a flow diagram of a method 700 of implementing and using a preset elevator call using an elevator system and a mobile device in accordance with one or more embodiments of the present disclosure. The method 700 includes generating the preset elevator call that includes programmed conditions that include a starting floor and a destination floor (operation 705). Further, the method 700 also includes storing the preset elevator call in a user profile on the mobile device and at least one corresponding triggering condition (operation 710). Additionally, the method 700 includes retrieving the preset elevator call based on detecting the corresponding triggering condition (operation 715), and executing the retrieved preset elevator call (operation 720).

Figure 8:
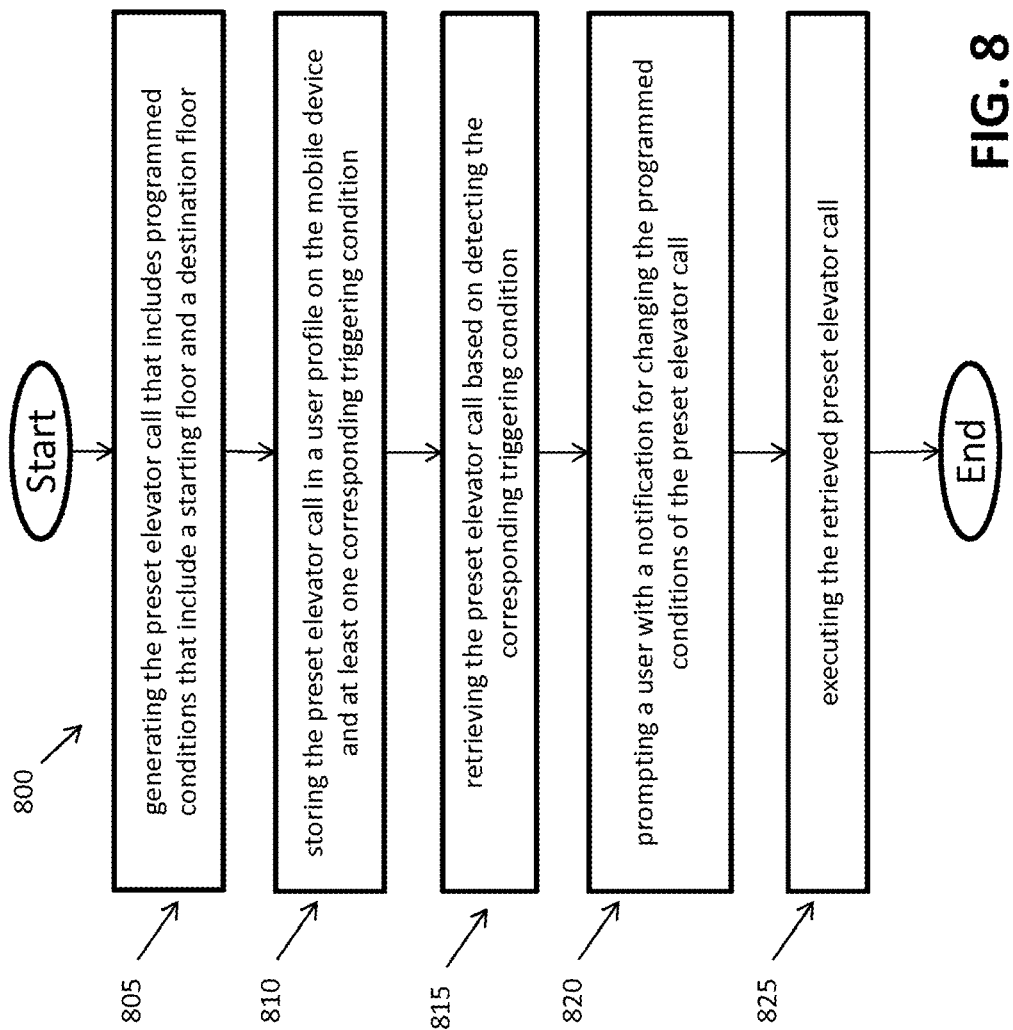
FIG. 8 depicts a flow diagram of a method of implementing and using a preset elevator call using an elevator system and a mobile device in accordance with one or more embodiments of the present disclosure.

FIG. 8 depicts a flow diagram of a method 800 of implementing and using a preset elevator call using an elevator system and a mobile device in accordance with one or more embodiments of the present disclosure.

The method 800 includes generating the preset elevator call that includes programmed conditions that include a starting floor and a destination floor (operation 805). Further, the method 800 also includes storing the preset elevator call in a user profile on the mobile device and at least one corresponding triggering condition (operation 810). Additionally, the method 800 includes retrieving the preset elevator call based on detecting the corresponding triggering condition (operation 815). Further, the method 800 includes prompting a user with a notification for changing the programmed conditions of the preset elevator call prior to executing the retrieved preset elevator call (operation 820). According to an embodiment, the notification includes an input interface for changing the programmed conditions of the preset elevator call. Finally, the method 800 includes executing the retrieved preset elevator call (operation 825).

According to one or more other embodiments, the notification is one selected from a group consisting of a notification displayed on a graphical user interface (GUI) on the mobile device, an interactive video displayed on the mobile device, an audio playback, a colored light output, and a vibration, light, or sound pattern output. The foregoing are provided as nonlimiting examples of notification methods.

Further, according to one or more other embodiments, the input interface is one or more selected from a group consisting of an antenna array configured to transmit and receive signals to determine the specific location of the mobile device, a GUI with one or more buttons displayed on a touchscreen portion of the mobile device, a physical button built into the chassis of the mobile device, a microphone, one or more image sensors, and one or more electromechanical gesture sensors integrated into the mobile device.

According to one or more other embodiments, the programmed conditions included in the elevator call further include one or more of a specific elevator car request, a person to call ratio for a group call, a pet indicator, an extra load time request, a large load indicator, and an ambient elevator car environment settings, wherein the elevator car environment settings includes lighting value and music selection.

According to one or more other embodiments, the corresponding triggering condition is one or more of a mobile device location, a tap on the mobile device, a shake of the mobile device, some other movement of the mobile device, a touch on a touchscreen of the mobile device, a voice command input through a microphone of the mobile device, an image input through an image sensor of the mobile device, a video input through the image sensor of the mobile device, and a physical button built into the surface of the mobile device.

Further, according to one or more other embodiments, the corresponding triggering condition is one or more of a date, a time, a location, a schedule, a linked calendar, an emergency, an elevator system sensor value, and a mobile device sensor value. For example, a preset call may be automatically entered for a user if an emergency occurs somewhere else in the building that could endanger the user even if the user does not yet know that such situation exists providing critical response time savings. According to another example, a user may have a set schedule that they stick to as they travel through a building. For example a security guard or a mail delivery person. Accordingly, they could program a set schedule that would trigger preset calls for them so they can more easily move through the building as needed.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

For example, according to another embodiment, a method to trigger an automatic elevator call to a destination based on preset conditions can be provided. In his embodiments, a user would arrive home or to their office. The user's mobile device would recognize the user's GPS position matches the home/office position in the preset call. The mobile device then retrieves the preset destination floor from the user profile and sends it to the elevator system. A default entrance floor would be assumed or set in the user profile since GPS cannot locate a person on a floor.

In another embodiment, a user enters a detection region on a floor in a building. The mobile device would recognize that the Bluetooth or WIFI signal strength had changed, determine which floor it is at through negotiation with wireless devices, retrieve a preset call and send it to the elevator system. One potential benefit of such an embodiment would be to provide a convenient method of call entry for users with their hands full.

Further, according to another embodiment, a Bluetooth mobile reader installed in the building and a user equipped with a mobile device running the compatible application enters the building. The user is able to set up their default elevator destination in the application. This destination will be automatically entered when their mobile device is in closer proximity to the Bluetooth mobile reader. Additionally, the user can be prompted with a notification farther away from the Bluetooth reader by extending the reader range. The user can then tap on the notification and change the preset elevator call before entering the closer auto call range of the reader. This embodiment can be realized in a system with or without access control. With access control the credential can reside on the mobile device and be sent with the elevator request. Accordingly, one or more means may be provided to override a call which is not possible with an RFID implementation today.

According to another embodiment, a method to trigger an automatic elevator call based on user gesture or action can be provided as discussed above. In this embodiment a preset elevator destination and trigger conditions are set up in advance in the user's profile. When the user arrives near elevator lobby the user's mobile device starts communicating with the elevator system. The user then shakes or taps their phone, causing the application on the phone to retrieve a preset call and send it to the elevator system. This embodiment provides a convenient method of call entry for users with their hands full as well.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description has been presented for purposes of illustration and description, but is not intended to be exhaustive or limited to the embodiments in the form disclosed. Many modifications and variations will be apparent to those of ordinary skill in the art without departing from the scope of the disclosure. The embodiments were chosen and described in order to best explain the principles of the disclosure and the practical application, and to enable others of ordinary skill in the art to understand various embodiments with various modifications as are suited to the particular use contemplated.

The present embodiments may be a system, a method, and/or a computer program product at any possible technical detail level of integration. The computer program product may include a computer readable storage medium (or media) having computer readable program instructions thereon for causing a processor to carry out aspects of the present disclosure.

The computer readable program instructions may execute entirely on the user's mobile device, partly on the user's mobile device, as a stand-alone software package, partly on the user's mobile device and partly on a remote computer or entirely on the remote computer or server. In the latter scenario, the remote computer may be connected to the user's mobile device through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Accordingly, the present disclosure is not to be seen as limited by the foregoing description, but is only limited by the scope of the appended claims.

What is claimed is:

1. A method of implementing and using a preset elevator call using an elevator system and a mobile device, the method comprising:
   generating the preset elevator call that includes programmed conditions that include a destination floor;
   storing the preset elevator call in a user profile on the mobile device and at least one corresponding triggering condition;
   retrieving the preset elevator call based on detecting the at least one corresponding triggering condition; and
   executing the retrieved preset elevator call;
   wherein the method further comprises:
   prompting a user with a notification for changing the programmed conditions of the preset elevator call after executing the retrieved preset elevator call,
   wherein the notification includes an input interface for changing the programmed conditions of the preset elevator call.

2. The method of claim 1, further comprising:
   prompting a user with a notification for changing the programmed conditions of the preset elevator call prior to executing the retrieved preset elevator call,
   wherein the notification includes an input interface for changing the programmed conditions of the preset elevator call.

3. The method of claim 1,
   wherein the notification is one selected from a group consisting of a graphical user interface (GUI) displayed on the mobile device, an interactive video displayed on the mobile device, an audio playback with audio listening input capability, and a vibration pattern output.

4. The method of claim 1,
   wherein the notification includes an input interface for changing the programmed conditions of the preset elevator call, and
   wherein the input interface is one or more selected from a group consisting of a graphical user interface (GUI) displayed on the mobile device, an interactive video displayed on the mobile device, an audio playback with audio listening input capability, and a vibration pattern output.

5. The method of claim 2, wherein prompting a user with a notification for changing the programmed conditions of the preset elevator call prior to executing the retrieved preset elevator call further comprises:
   moving the mobile device within range of a first wireless communication area to trigger the prompting, and
   wherein the notification expires and the elevator is executed in response to the mobile device moving within range of a second wireless communication area within the first wireless communication area.

6. The method of claim 1,
   wherein the corresponding triggering condition is a geofencing condition that includes detecting the mobile device resides within a defined area using global positioning system (GPS) or cellular towers.

7. The method of claim 1,
   wherein the corresponding triggering condition is a geofencing condition that includes detecting the mobile device resides within a defined area,
   wherein the defined area is determined based on at least one of triangulating the mobile device, tracking the mobile device using at least one of a determining approximate position based on a connection to at least one of a Bluetooth device, near field communication, WiFi, and z-wave wireless communication device with a known position.

8. The method of claim 1,
   wherein the corresponding triggering condition is a gesture,
   wherein the gesture is one or more of a shake of the mobile device, a tap on the mobile device, a mobile device camera detected movement, and a stationary camera detected movement, or a combination of gestures,
   wherein different gestures or combination of gestures correspond to different preset elevator calls.

9. The method of claim 1, wherein the programmed conditions further include one or more of a starting floor, a specific elevator car request, a pet indicator, an extra load time request, a large load indicator, and an ambient elevator car environment setting including lighting value and music selection.

10. The method of claim 1, wherein the corresponding triggering condition is one or more of a mobile device location, a tap on the mobile device, a shake of the mobile device, a touch on a touchscreen of the mobile device, a voice command input through a microphone of the mobile device, an image input through an image sensor of the mobile device, a video input through the image sensor of the mobile device, and a physical button built into the surface of the mobile device.

11. The method of claim 1, wherein the corresponding triggering condition is one or more of a date, a time, a location, a schedule, a linked calendar, an emergency, an elevator system sensor value, and a mobile device sensor value.

12. A system for implementing and using a preset elevator call using an elevator system and a mobile device, the system comprising:
- a mobile device comprising:
  - a processor configured to generate the preset elevator call that includes programmed conditions that include a destination floor; and
  - a memory configured to store the preset elevator call in a user profile and store at least one corresponding triggering condition; and
- an elevator comprising:
  - an elevator controller that is configured to receive the preset elevator call and call one or more elevator cars; and
  - the one or more elevator cars that are configured to travel between floors of a building based on the preset elevator call received from the elevator controller;
- wherein the mobile device includes a touchscreen display configured to display a notification for changing the programmed conditions of the preset elevator call after executing the received preset elevator call,
- wherein the notification includes an input interface for changing the programmed conditions of the preset elevator call.

13. The system of claim 12, further comprising:
- wherein the notification is one selected from a group consisting of a graphical user interface (GUI) displayed on the mobile device, an interactive video displayed on the mobile device, an audio playback with audio listening input capability, and a vibration pattern output, and
- wherein the input interface is one or more selected from a group consisting of a touch screen, a kiosk, a security station, a beacon, a hall call fixture, a lantern, a bridge, a router, a network node, and a mobile device.

14. The system of claim 13,
- wherein displaying the notification to the user is triggered by moving the mobile device within range of a first wireless communication area, and
- wherein the notification expires and the elevator call is executed when the mobile device moves within range of a second wireless communication area within the first wireless communication area.

15. The system of claim 12,
- wherein the corresponding triggering condition is a geofencing condition that includes detecting the mobile device resides within a defined area,
- wherein the defined area is determined based on at least one of triangulating the mobile device, tracking the mobile device using at least one of a global positioning system (GPS), cellular towers, and determining approximate position based on a connection to at least one of a Bluetooth device, near field communication, WiFi, and z-wave wireless communication device with a known position.

16. The system of claim 12,
- wherein the corresponding triggering condition is a gesture,
- wherein the gesture is at least one or more of a shake of the mobile device, a tap on the mobile device, a mobile device camera detected movement, and a stationary camera detected movement, a combination of gestures,
- wherein different gestures correspond to different preset elevator calls, and
- wherein different combination of gestures correspond to different preset elevator calls.

17. The system of claim 12,
- wherein the programmed conditions included in the elevator call further include one or more of a specific elevator car request, a person to call ratio for a group call, a pet indicator, an extra load time request, a large load indicator, and an ambient elevator car environment settings,
- wherein the elevator car environment settings includes lighting value and music selection, and
- wherein the corresponding triggering condition is one or more of a mobile device location, a tap on the mobile device, a shake of the mobile device, a touch on a touchscreen of the mobile device, a voice command input through a microphone of the mobile device, an image input through an image sensor of the mobile device, a video input through the image sensor of the mobile device, a physical button built into the surface of the mobile device, a date, a time, a location, a schedule, a linked calendar, an emergency, an elevator system sensor value, and a mobile device sensor value.

18. A computer program product for implementing and using a preset elevator call using an elevator system and a mobile device, the computer program product comprising a non-transitory computer readable storage medium having program instructions embodied therewith, the program instructions executable by a processor to cause the processor to:
- generate the preset elevator call that includes programmed conditions that include a destination floor;
- store the preset elevator call in a user profile on the mobile device and at least one corresponding triggering condition;
- retrieve the preset elevator call based on detecting the at least one corresponding triggering condition; and
- execute the retrieved preset elevator call;
- wherein the computer program product includes additional program instructions executable by the processor to cause the processor to:
- prompt a user with a notification for changing the programmed conditions of the preset elevator call after executing the retrieved preset elevator call,
- wherein the notification includes an input interface for changing the programmed conditions of the preset elevator call.

* * * * *